W. FUHR.
MACHINE FOR MAKING PAPER RECEPTACLES.
APPLICATION FILED JULY 21, 1920.

1,411,338.

Patented Apr. 4, 1922.
9 SHEETS—SHEET 2.

W. FUHR.
MACHINE FOR MAKING PAPER RECEPTACLES.
APPLICATION FILED JULY 21, 1920.

1,411,338.

Patented Apr. 4, 1922.

Inventor:
William Fuhr
By

W. FUHR.
MACHINE FOR MAKING PAPER RECEPTACLES.
APPLICATION FILED JULY 21, 1920.

1,411,338.

Patented Apr. 4, 1922.
9 SHEETS—SHEET 4.

Inventor:
William Fuhr

W. FUHR.
MACHINE FOR MAKING PAPER RECEPTACLES.
APPLICATION FILED JULY 21, 1920.

1,411,338.

Patented Apr. 4, 1922.
9 SHEETS—SHEET 7.

Inventor:
William Fuhr
By: Wm. F. Belt
Atty.

W. FUHR.
MACHINE FOR MAKING PAPER RECEPTACLES.
APPLICATION FILED JULY 21, 1920.

1,411,338.

Patented Apr. 4, 1922.

UNITED STATES PATENT OFFICE.

WILLIAM FUHR, OF CHICAGO, ILLINOIS, ASSIGNOR TO WESTERN PAPER-BOX COMPANY, A CORPORATION OF ILLINOIS.

MACHINE FOR MAKING PAPER RECEPTACLES.

1,411,338.   Specification of Letters Patent.   Patented Apr. 4, 1922.

Application filed July 21, 1920. Serial No. 397,808.

*To all whom it may concern:*

Be it known that I, WILLIAM FUHR, a citizen of the United States, residing at Chicago, in the county of Cook and State of Illinois, have invented certain new and useful Improvements in Machines for Making Paper Receptacles, of which the following is a specification.

This invention relates to machines for the manufacture of paper receptacles but more particularly folded blank buckets such as are intended for carrying ice cream or other foods of liquid or semi-liquid consistency.

The primary object of this invention is to provide an improved mechanism which will be simple in construction, easily operated and controlled, and which will rapidly produce buckets of uniform size, attractive appearance, and free from the imperfections so frequently found in articles of this type. Another object is to provide a progressive operation in which a plurality of blanks are simultaneously and successively passing through the various stages, thus securing a large output with the machine running at a low rate of speed.

Further objects are to provide an improved folding mechanism in which scoring of the sides of the carton will be prevented and smooth, even folds produced; to facilitate cleaning the glue container and the feeding means operating in connection therewith; to insure an adequate supply of glue to the blank; to maintain the blank upon the holder while the glue applying means is being withdrawn therefrom; to prevent the application of glue to the blank holder when no blank is in place thereon; to firmly hold the blank while a bail is being inserted into slots in the blank provided for the purpose; to facilitate cleaning and oiling the operating parts; and to provide simple and positive means for removing the finished carton from the machine.

The many other objects and advantages of the invention will be readily evident from the following specification when read in connection with the accompanying drawings illustrating a selected embodiment thereof and in which—

In the present embodiment of the invention, the machine comprises four mechanisms radially mounted on a continuously revolving turret. Each of these mechanisms is alike in structure and operation and adapted to perform the complete cycle of operations on a blank from the time of feeding to the ejectment of the finished bucket. These mechanisms are so arranged and controlled that each mechanism is operating upon a blank in one of the successive stages of the operation simultaneously. One mechanism is receiving a blank while the next is presenting the blank fed at the previous stage to receive a tape bail, the third is at the same time folding a blank which has passed through the two previous stages; and the fourth is ejecting a finished bucket.

Figures 21, 22:
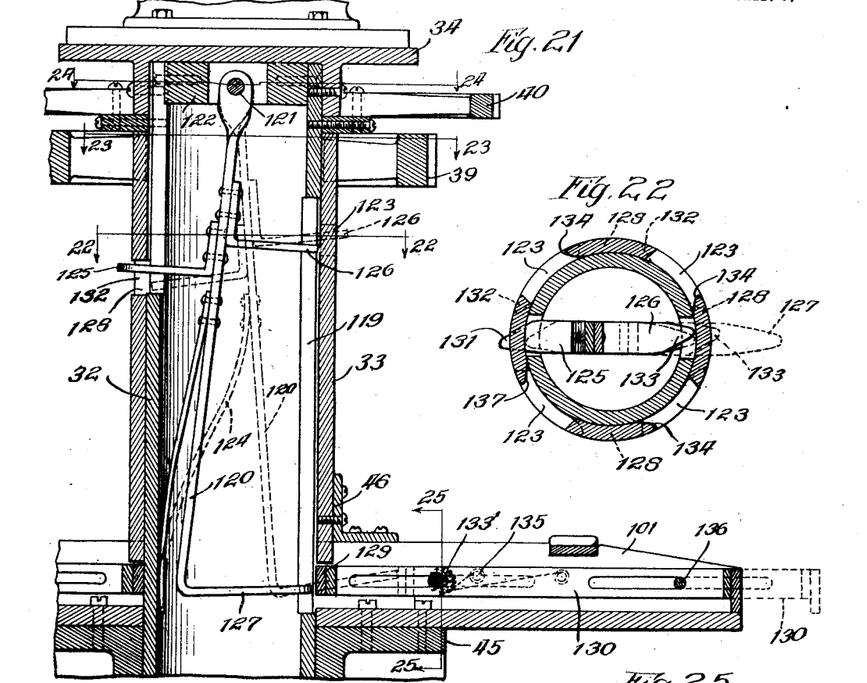
Fig. 21 is a central vertical section of the revolving turret showing the bucket discharging mechanism.
Fig. 22 is a horizontal section on the line 22—22 of Fig. 21.
Figure 23:
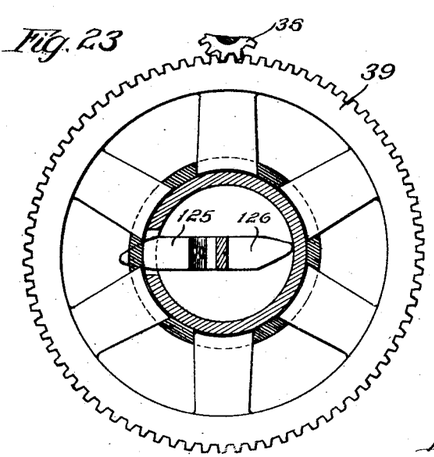
Fig. 23 is a horizontal section on the line 23—23 of Fig. 21.
Figure 24:
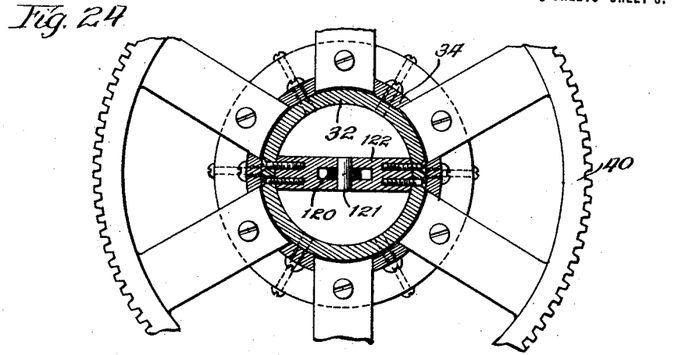
Fig. 24 is a horizontal section on the line 24—24 of Fig. 21.
Figure 25:
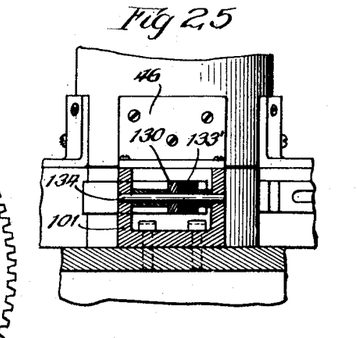
Fig. 25 is a vertical section on the line 25—25 of Fig. 21.
Figure 26:
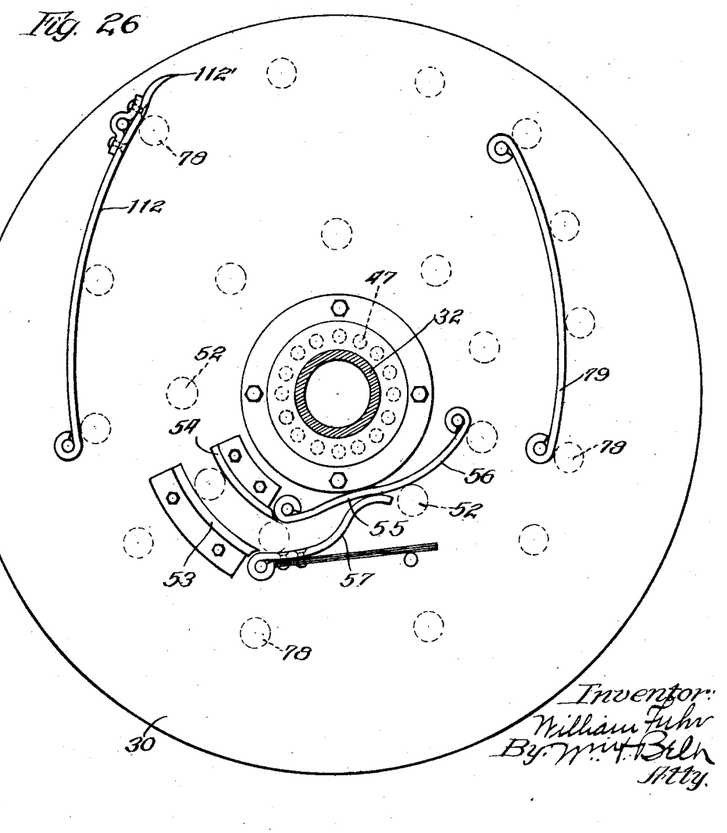
Fig. 26 is a detail top plan view of the stationary table.

Referring to the drawings the machine comprises a stationary table 30 mounted on a suitable support 31 and having secured thereto a vertical hollow post 32. A turret comprising a mechanism supporting sleeve 33 revolubly fits about this hollow post 32 and a cap 34 fits over and is secured to the top of the post 32. An operating motor 35 is fastened upon the cap 34 and this motor causes the sleeve 33 to rotate counterclockwise through the medium of the worm gear 36, the shaft 37, the pinion 38 and the gear 39. This gear 39 is fixed upon the upper portions of the sleeve 33. A stationary gear 40 best shown in Figs. 21 and 24 is secured to the cap 34 and the post 32.

Four complete operating mechanisms 41, 42, 43 (not shown) and 44 each identical in construction and operation are mounted upon the rotary sleeve 33 in the same manner and as each of these mechanisms performs the complete cycle of operations from the receiving of the formed blank to the ejecting of the finished bucket, only one of such mechanisms and its method of mounting and operation will be described hereinafter. These mechanisms are preferably positioned about the axis of revolution of the sleeve with their central horizontal axis at an angle of 90° from the corresponding axis of each of the next adjacent mechanisms and are disposed radially of such sleeve.

Figure 4:
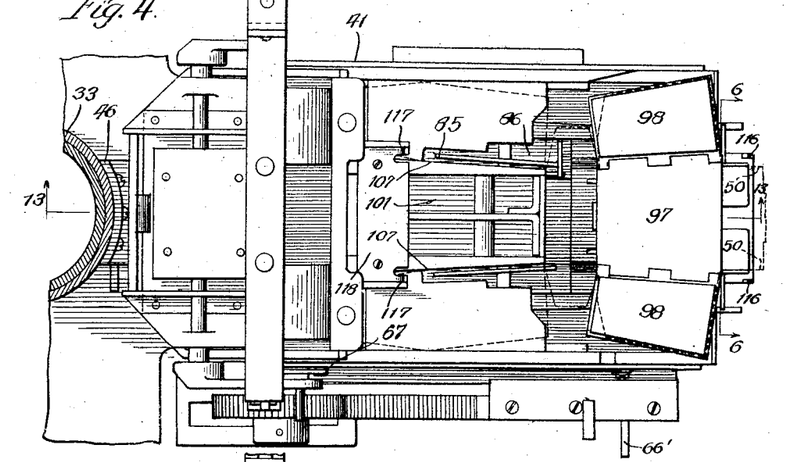
Fig. 4 is an enlarged top plan view of a portion of the invention showing the parts in the feeding position.
Figures 13, 14, 15:
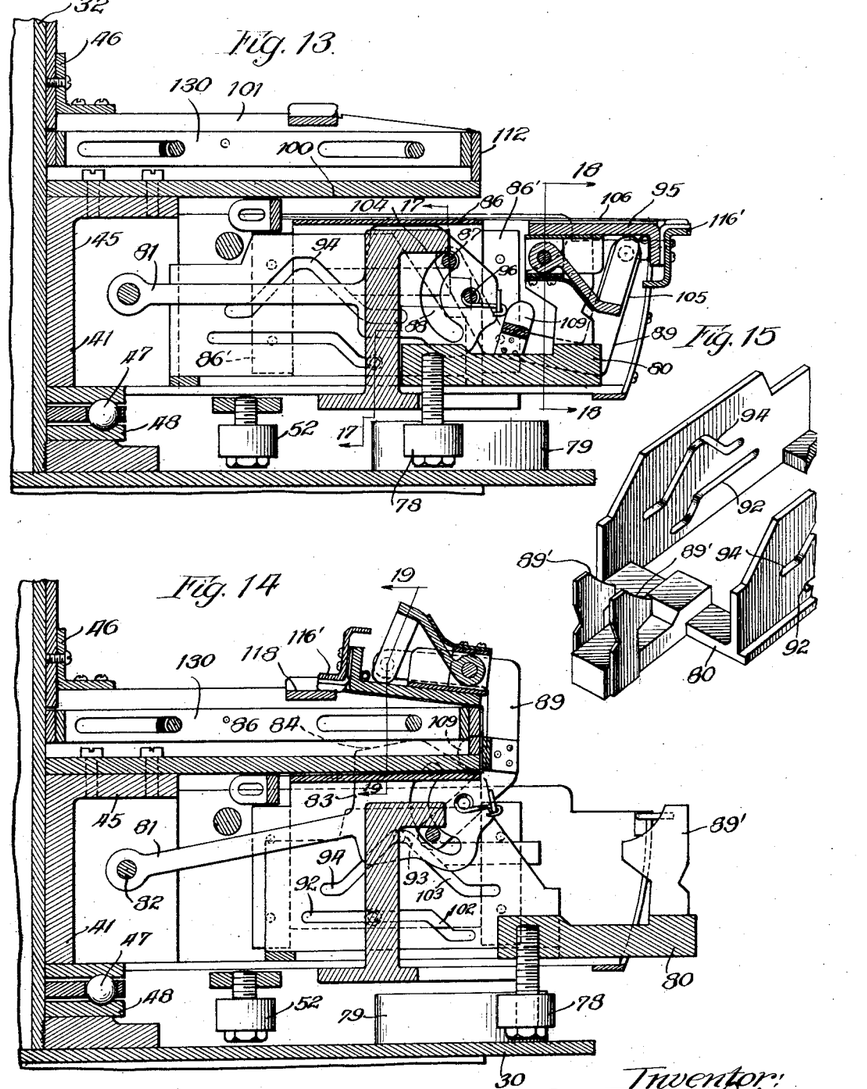
Fig. 13 is a vertical section on the line 13—13 of Fig. 4; the parts being in the position at the start of the folding operation.
Fig. 14 is the same as Fig. 13 with the parts in the position of partial completion of the folding operation.
Fig. 15 is a detail perspective view.

The hollow frame 45 of the mechanism 41 is secured to the sleeve 33 by means of a bracket 46 and its under face rests upon the ball bearing 47 rolling upon the support 48 secured to the post 32, as is best shown in Figs. 13 and 14. The operator stands opposite the outer end of the mechanism at the feeding position and inserts the blank into the machine from the right hand or forward side thereof to the position indicated in dotted lines in Fig. 4 of the drawing as the mechanism passes him. The outer end portion 49 of the blank is pressed by the operator between and has its side edges 50 engaged by the spring pressed grippers 51 in order to properly position the blank relative to the various operating parts.

The grippers 51 are formed on blocks 51' pivotally mounted on the pins 52' and controlled by the spring 53'. The outer extremities of these blocks 51' rest upon the projecting rods 115 which cause such blocks to move the grippers inwardly against the action of the spring 53' to hold a blank tightly as described.

Figures 5, 6, 7:
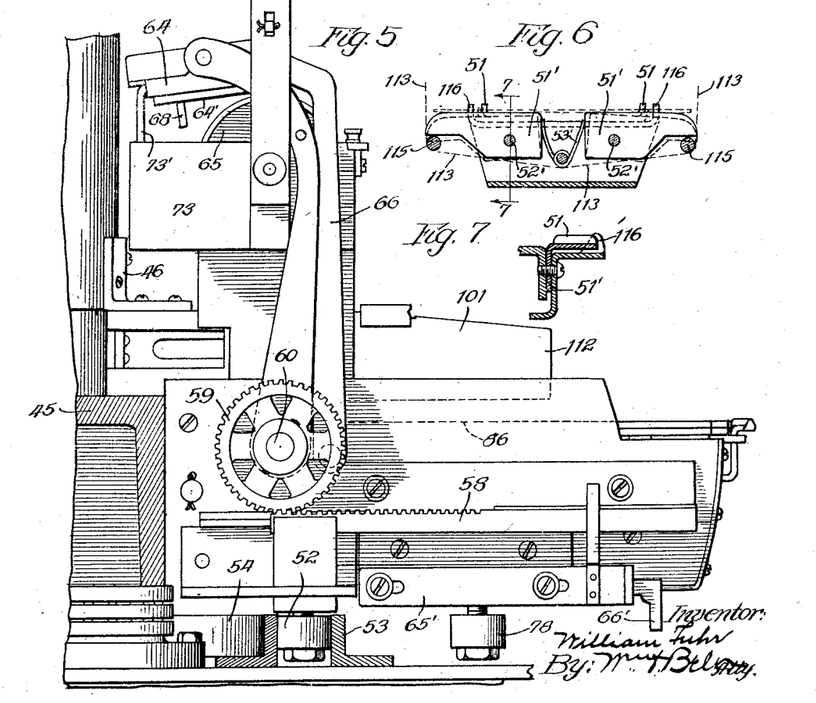
Fig. 5 is a side elevation of the portion of the invention shown in Fig. 4, the parts being in the same relative position.
Fig. 6 is a vertical section on the line 6—6 of Fig. 4.
Fig. 7 is a vertical section on line 7—7 of Fig. 6.
Figure 8:
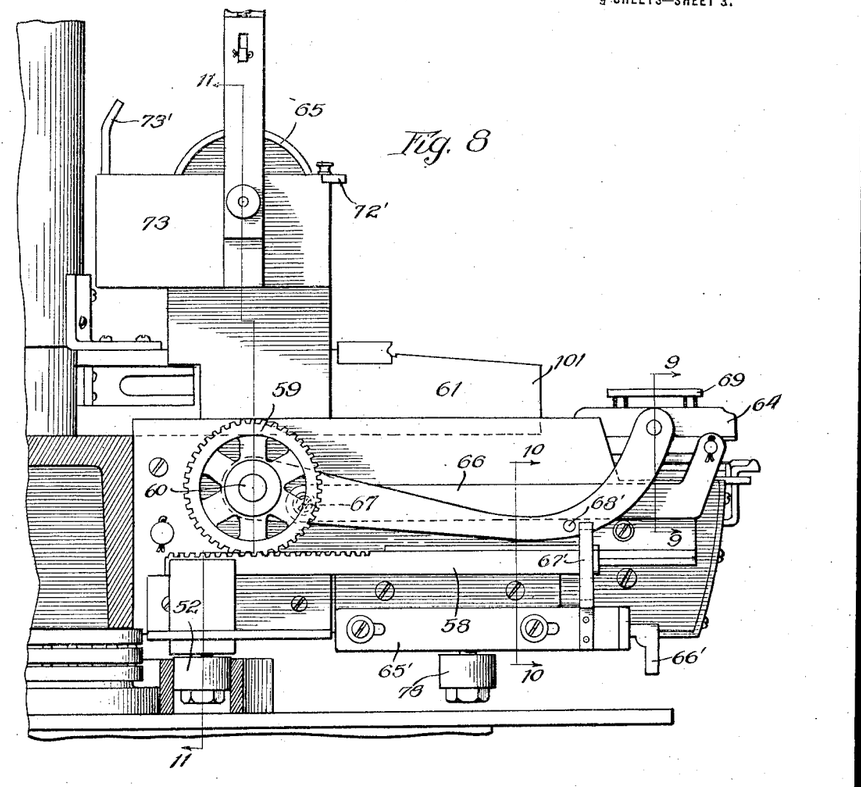
Fig. 8 is the same as Fig. 5, but with the parts in the gluing position.
Figure 9:
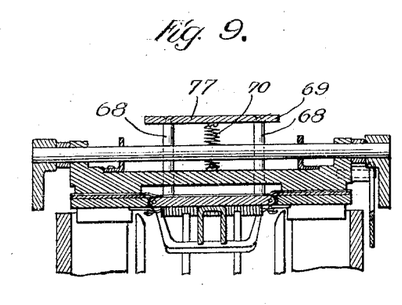
Fig. 9 is a vertical section on the line 9—9 of Fig. 8.
Figure 10:
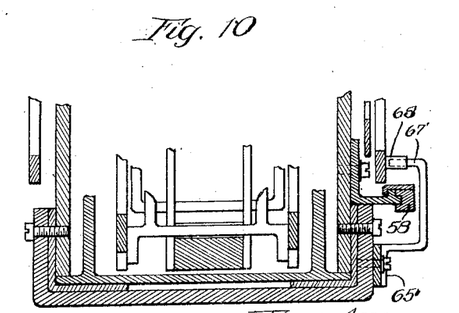
Fig. 10 is a vertical section on the line 10—10 of Fig. 8.
Figure 11:
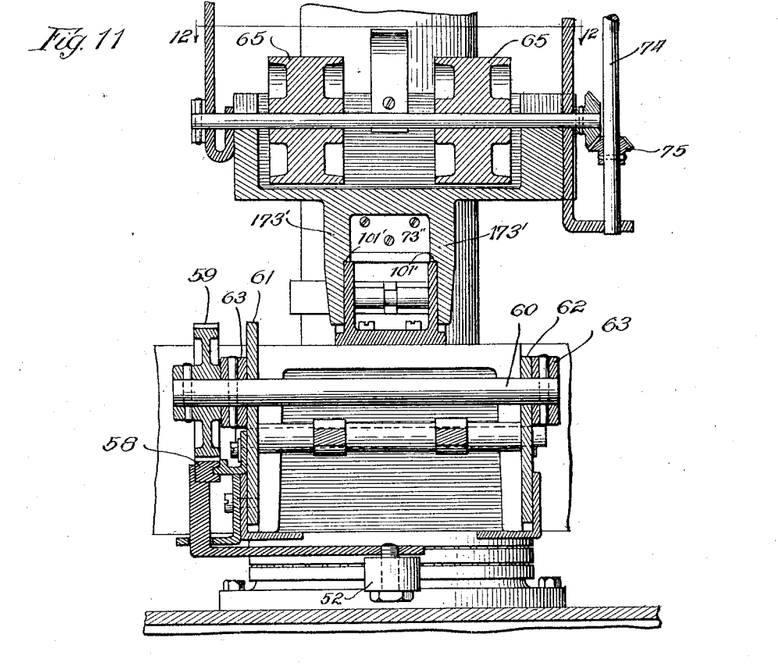
Fig. 11 is a vertical section on the line 11—11 of Fig. 8.
Figure 12:
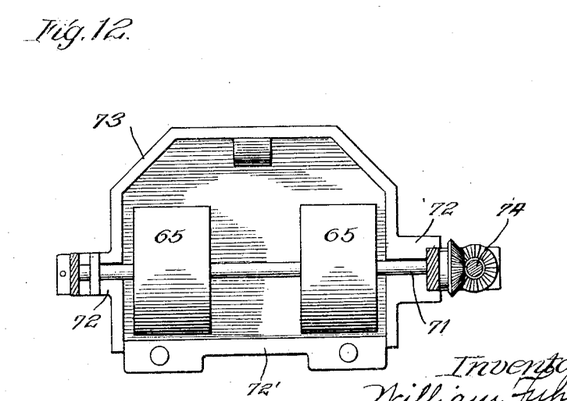
Fig. 12 is a horizontal section on the line 12—12 of Fig. 11 showing the glue part and gluing rolls in detail.

As the mechanism 41 leaves the feeding position the cam roller 52 is passing between the guides 53 and 54, as shown in Fig. 5, on the top face of the stationary table 30 and is gradually forced inwardly into the bend 55 in the cam rail 56 by the spring pressed arm 57. The inward movement of the cam roller causes the rack 58 connected thereto to be drawn inwardly and to rotate the pinion 59 keyed to the shaft 60. This shaft 60 is revolubly mounted in the side plates 61 and 62 on the frame 45. Oppositely disposed arms 63 are fixed upon the shaft 60 and, as the pinion is rotated by the rack 58, these arms swing outwardly and downwardly carrying the gumming die 64 over the glue rolls 65 and into contact with the blank in the position shown in Fig. 8. Arms 66 disposed on opposite sides of the side plates and pivotally mounted thereon at 67 are pivotally connected to the gumming die 64 and maintain this member with its operating face 64' substantially parallel with the face of the blank. The downwardly projecting rods 68 on the spring controlled presser member 69 engage the blank before the gumming die 64 comes in contact therewith and such member is pressed upwardly against the action of the spring 70, as best shown in Figs. 8 and 9. When the cam roller 52 is again pressed outwardly by the conformation of the cam rail 56 the gumming die 64 is raised and passes rearwardly over and in contact with the glue rolls 65. These glue rolls 65 are mounted on the shaft 71 supported by bearings 72 in the side walls of the glue pot 73. A finger 73' is preferably provided on the upper edge of the glue pot 73 to cause the gumming die to be tipped downwardly while in engagement with the glue rolls 65 to insure full contact of the face of the die with such rolls, as is shown in Fig. 5 of the drawings. The shaft 71 is driven by the shaft 74 through the medium of the bevel gear 75, as best shown in Figs. 11 and 12. A pinion 76 is mounted at the upper extremity of this shaft 74 and meshes with the stationary gear 40 on the post 32 so that the rotation of the sleeve 33 causes this pinion 76 to roll upon the periphery of the gear 40 and the glue rolls 65 to be continuously rotated within the glue pot. As the gumming die 64 is lifted from the blank in the manner described, the rods 68 on the presser member 69 continue to press against the blank until the gumming die has moved sufficiently to permit the top member 77 on the presser member to seat itself upon the top of the gumming die. This prevents the gummed blank from being drawn upwardly by the gumming die. An adjustable scraper 72' is mounted on the edge of the glue pot 73 to regulate the supply of gum on the gumming die. In order to prevent the application of glue to the blank supporting means when no blank is in place thereon, I have provided means for engaging the arms carrying the gumming die to maintain this die out of contact with the face of the blank supporting means. In the present embodiment this safety device consists of a slidable bar 65' mounted on the side plate 61 of the frame 45 and controlled by the handle or operating piece 66'. On this slidable bar there is an upwardly projecting finger 67' which is adapted to engage the pin 68' when the bar 65' is moved to its rearward position and thus prevents the spring pressed gumming die 64 from coming in contact with the blank holder. The hooked end 112' on the cam rail 112 causes the sliding bar 65' to return to its normal position after the gumming operation is complete.

The continued revolution of the sleeve 33 now moves the mechanism 41 into the second position or stage where the tape bail 113 is inserted in the slots 114 in the blank provided for the purpose. This is accomplished by the operator grasping one end of the length of tape in each hand and with the tape extended horizontally between the spaced hands lifting it beneath the rods 115 into the position indicated in broken lines in Fig. 6 of the drawing, then moving the hands forwardly to insert the tape in the slots 114 and pressing the ends down upon the gummed blank.

Figure 16:
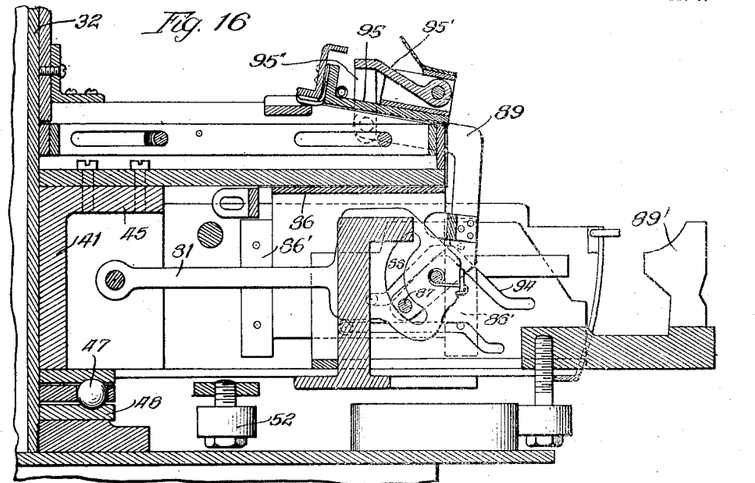
Fig. 16 is the same as Fig. 14 but with the parts in the position at the completion of the folding operation.
Figure 17:
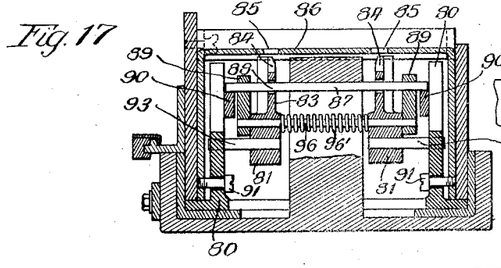
Fig. 17 is a vertical section on the line 17—17 of Fig. 13.
Figure 18:
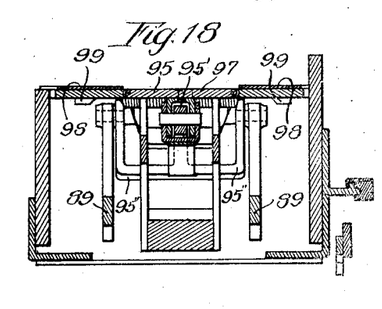
Fig. 18 is a vertical section on the line 18—18 of Fig. 13.
Figure 19:
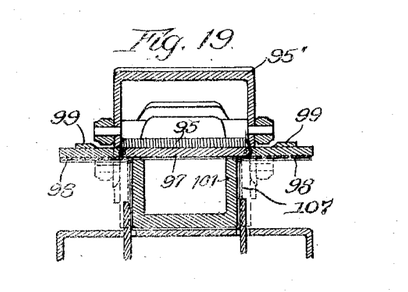
Fig. 19 is a vertical section on the line 19—19 of Fig. 14.

The mechanism now enters the third stage of its operation. The cam roller 78 engages the cam rail 79 causing the slidable frame 80, best shown in Fig. 15, to which this cam roller is secured to be moved outwardly in the manner indicated in Figs. 13, 14, and 16. Two arms 81 are pivotally mounted on the horizontal shaft 82 in the frame 45 and the outer enlarged ends 83 of these arms 81 have lower folding members 84 projecting upwardly therefrom and adapted to pass through the slots 85 in the blank supporting member 86. A rod 87 passes through oppositely disposed curved slots 88 in the enlarged ends 83 of the arms 81. This rod 87 passes through the two oppositely disposed arms 89 and has its extremities resting on the guides 90 formed on the oppositely disposed inner walls of the member 80. Oppositely disposed stud bolts 91 pass through cam slots 92 in the side walls of the member 80 and are threaded into tapped holes in the blank supporting member 86. Oppositely disposed stud shafts 93 have their inner extremities set in the end portions 83 of the arms 81 and project laterally through the cam slots 94 in the side walls of the member 80.

The winged folding member 95 is pivotally connected to the arm 95' on the yoke 95" and this yoke has its outer extremities pivotally connected to the corresponding outer extremities of the arms 89. Such arms 89 are pivotally connected to the end portions 83 of the arms 81 by the rod 96. The folding member 95 consists of a main presser plate 97 having oppositely disposed wings 98 hingedly mounted thereon and on the lower face of these wings cams 99 are secured or otherwise formed. A spring 96' about the shaft 96 has its extremities secured to the outer extremities of the arms 81 to permit lateral yielding of the arms 81 during the operation of the folding members 84.

The outward movement of the member 80 under the action of the cam rolls 78 first causes the blank holding member 86 to be raised between the guides 86' substantially into contact with the under face 100 of the form block 101 by the action of the inclined portion 102 of the cam slot 92 on the stud bolts 91, and to be held in this position during the entire further advance of the member 80. Simultaneously with the upward movement of the member 86 the upturned portion 103 of the cam slots 94 lifts the arm 81 from the position shown in Fig. 13 to that of Fig. 14. As these arms 81 rise, the shaft 87, being in engagement with the under face of the shoulder 104, causes the inner extremities of the arms 89 to be moved downwardly relative to their pivotal connection 96 in the outer extremities 83 of the arms 81, and the outer extremities 105 of these arms and the folder member 95 carried thereby to be correspondingly raised from the position shown in Fig. 13 to that of Fig. 14.

Figures 2, 3:
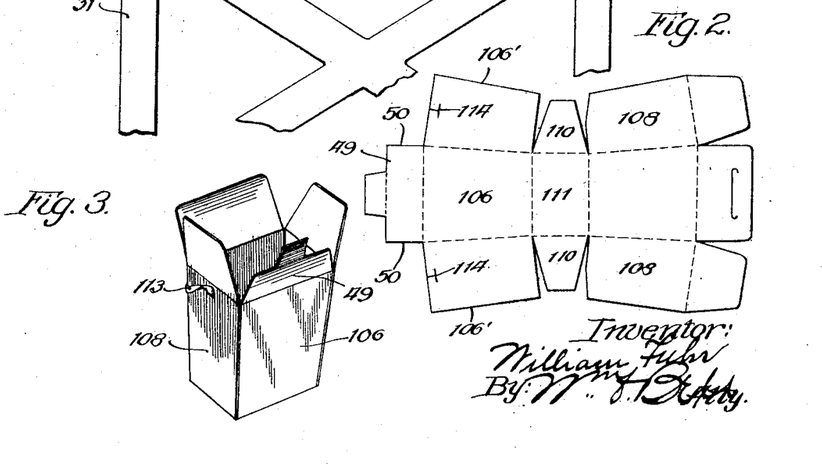
Fig. 2 is a detail plan view of a formed blank.
Fig. 3 is a perspective view of a finished bucket.

The upward movement of the folder member 95 carries with it the outer portion 106 of the blank resting thereon and presses it downwardly on the top of the form block 101. While the folding member 95 is moving upwardly in the manner described, the upper projections 84 on the end portions 83 of the arms 81 pass through the slots 85 close to the corresponding side walls 107 of the form block 101 and turn upwardly the side flaps 108 of the blank against such side walls as best shown in Fig. 2. On each of the arms 89 is formed a forwardly projecting leg 109 which engages the corresponding flap 110 on the blank and turns it upwardly against the already upturned side flap 108. After the projections 84 on the arms 81 have completed the folding of the side flaps of the blank the conformation of the cam slot 94 causes the arms 81 to swing downwardly into the position indicated in Fig. 16, lowering the shaft 96 and causing the arms 89 to be moved bodily downwardly. This downward movement of the arms 89 causes the yoke to swing from the position shown in Fig. 14 to that of Fig. 16 and the inner faces of the yoke engage the wings 98, folding such wings downwardly against the sides of the form block 101. The engagement of these inner faces with the cam faces 99 on such wings further binds the wings tightly against the side walls. In this way the flaps 106' previously gummed by the gumming die are folded on the flaps 108 and 110 and firmly adhere thereto. The upward travel of the folding member 95 already described folds the base portion 111 of the blank on the end portion 112 of the form block 101.

Figure 20:
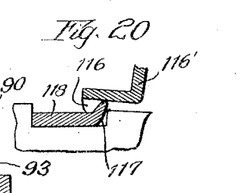
Fig. 20 is a detail sectional view.

Lugs 116 are preferably formed on the rear plate 116' on the folding member 95 to engage with corresponding lugs 117 on the top plate 118 on the form block 101 when the folding member is in the position indicated in Fig. 14 so that as the wings 98 swing downwarly to fold the flaps 108 there will be no false movement of the folding member. A detail view of these engaging lugs is shown in Fig. 20 of the drawings.

After the blank has been gummed, taped and completely folded as described, the cam roller 78 engages the near end of the cam rail 112 which causes the member 80 to be returned to its inward position as shown in Fig. 13. Trips 89' on the rear extremity of the sliding member 80 engage the rear portion 95' of the folding member 95 as the arms 89 swing downwardly, causing such member to be turned with its operating face upward in position shown in Fig. 13 of the drawings. The folding parts are now in their normal or initial position. When the folding member 95 starts to rise, the blocks 51' are pressed into the dotted position by spring 53', as indicated in Fig. 6, and the grippers 51 release the blank held thereby.

Figure 1:
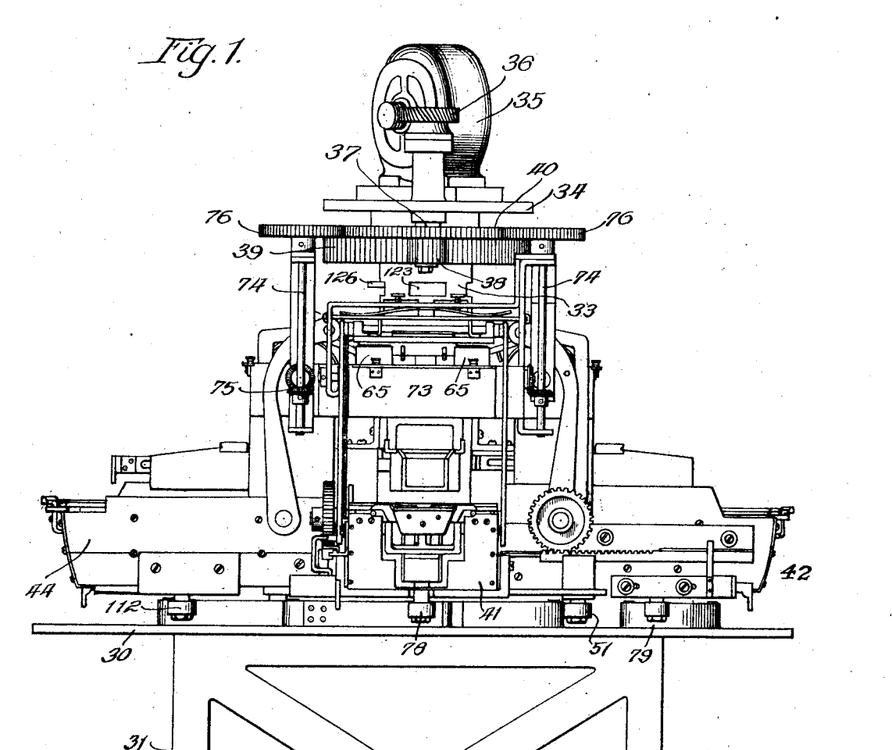
Fig. 1 is a side elevation of the invention complete.

Upon the completion of the folding operation described, the mechanism 41 enters its fourth or ejectment stage which is that indicated in Fig. 1 of the drawings for the mechanism 44. The post 32 is provided with an elongated vertical slot 119 disposed opposite to the kicker member 120 pivotally mounted at 121 in the block 122 set in the upper extremity of the post 32. The sleeve 33 is provided with four slots or openings 123 through the wall thereof, as shown in Fig. 22. The kicker 120 has secured thereto a spring arm 124 coacting with the inner walls of the post and it is likewise provided with oppositely projecting arms 125 and 126 secured thereto, the arm 125 projecting in the opposite direction from the forwardly bent portion 127 of the kicker. The kicker is normally held in its rearward or inoperative position by the outer extremity of the arm 126 contacting with the inner wall of the sleeve 33 but when this sleeve has moved one of the four mechanisms to the position of ejection, the extremity of the arm 126 comes opposite one of the openings 123 in the sleeve, and the arm 126 is then forced into such opening 123 by the spring 124 in the manner indicated in dot in Fig. 21. This permits the end of the kicker to strike against the end plate 129 on the ejector 130 and force such ejector into the position indicated in dot, ejecting the bucket from the form block 101.

In case the spring 124 should become broken I have provided means for positively operating the kicker. Four openings 128 similar in character to the openings 123 and shown in dot in Fig. 22 are so disposed relative to the arm 125 that the free end of this arm is permitted to project through one of the openings 128 while the arm 126 is held rearwardly by the walls of the sleeve 33. Likewise the openings 123 are disposed relative to the walls of the sleeve between the openings 128 so that while the arm 126 is held forwardly by such walls, the arm 126 can project through the corresponding opening 123. As each of the mechanisms reaches the ejecting position, the arm 125 which is projecting through the opening 128 has its angular face 131 engaged by the advancing angular side edge 132 of the sleeve and forced inwardly to eject the bucket. The kicker is forced rearwardly by the angular face 133 of the arm 126 engaging the advancing edge 134 of the sleeve. The ejector arm 130 is caused to be returned by the helical spring 133' mounted on the pin 134 in the form block 101 and having its forward extremity secured to the pin 135 set in the ejector 130. The return travel of the ejector 130 is limited by the stop pin 136.

The cycle of operations on the blank having now been completed, the mechanism 41 continues to rotate with the sleeve 33 past its initial or feeding position where a new blank is inserted by the operator and the cycle of operation is repeated.

Figure 27:
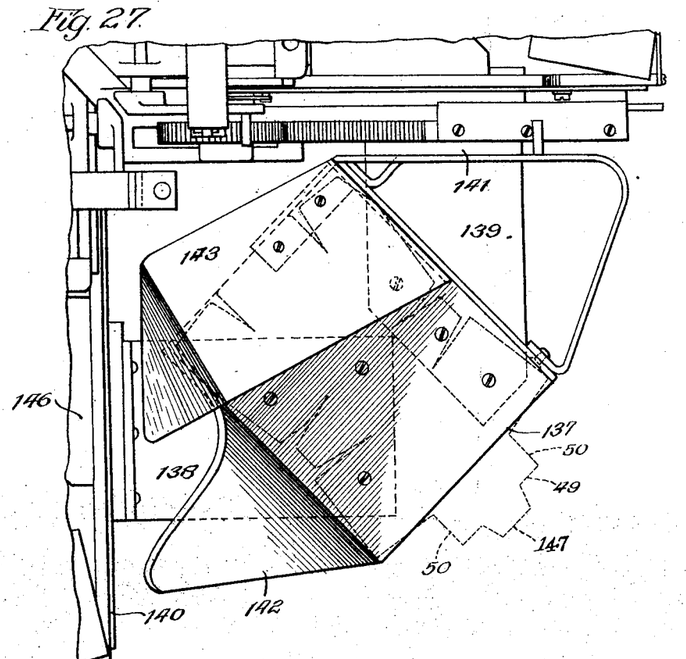
Fig. 27 is a detailed top plan view of the blank holder and feeding guide.
Figure 28:
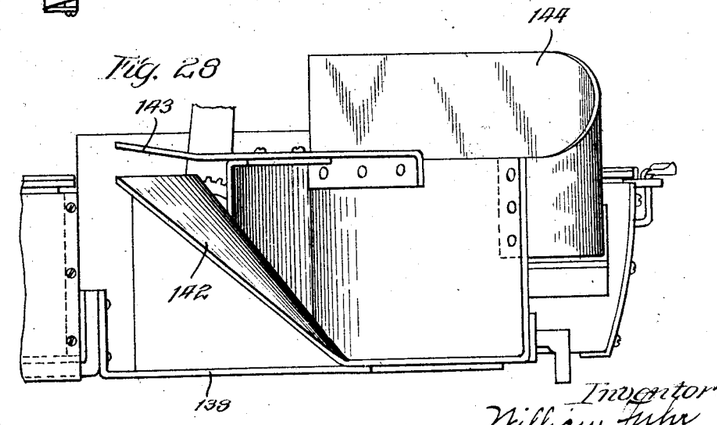
Fig. 28 is the same as Fig. 7, side elevation.

While the blanks may be supported in any desired manner and fed manually by the operator to the device at the feeding position I have found it advantageous to use a blank holder 137 which is supported upon brackets 138 and 139 secured to the side walls 140 and 141 of each adjacent pair of operating mechanisms in the manner shown in Fig. 27 of the drawings. On this support 137 is formed a curved lower guide 142 and an upper guide 143. I have mounted on this support a shield or guard plate 144 to protect the operator from the gumming die carrying arm. The blank supports 137 are rotating counter-clockwise with the rest of the mechanism and, as a blank support comes opposite the operator, he grasps the forward edge 50 of the uppermost blank and lifts the same. By holding the forward edge of the blank stationary in this raised position the rear portion of the blank is forced forwardly by the lower portion of the guide 142. The curved surface of such guide now contacts with the held blank, causing it to be inverted and to slide between the guides 142 and 143 into the folding mechanism 146 in the proper position and it is only necessary for the operator to press the flap 147 downwardly between the grippers in the manner which has been previously described. No skill whatever is required to feed the blank to the mechanism when this blank supporting and guiding means is provided.

In order to facilitate cleaning the glue pot 73, I have constructed the same readily removable from the machine. A pair of downwardly projecting plates 173' fit the sides of the form block 101 and the pot is supported by shoulders 101' on such plates and by a horizontally projecting plate 73" which rests on the top of the form block. To remove the glue pot with the rolls 65 and the driving mechanism therefor, merely lift the same in any convenient manner. This permits the glue remaining in the pot at the completion of the day's operations to be emptied into the supply barrel and the pot to be thoroughly cleaned. A considerable saving in glue is thus accomplished for the glue, if allowed to remain in the pot, would harden.

It will thus be seen that in the present invention there are a plurality of complete and duplicate mechanisms mounted upon a continuously rotating turret, each of such mechanisms comprising means for receiving a formed blank, applying gum to such blank, folding the gummed blank, and ejecting the finished bucket. The complete operation is performed in a single mechanism during one revolution of the turret and takes place in successive stages of the revolution. The mechanisms on the turret are actuated and controlled by members on the stationary support so disposed about the axis of the turret that each mechanism is performing the same state when in the same position relative to such support and the mechanism follow each other in sequence through the various stages. By this means when a completed bucket is being ejected in one mechanism, the next succeeding mechanism is folding a gummed blank, the next mechanism is presenting a blank already gummed to have a bail applied thereto, and the fourth mechanism is receiving a blank.

In the present embodiment, the gumming operation takes place between the stages of blank receiving and bail applying. A convenient means has been provided for preventing the gumming of the blank supporting means when no blank is in place thereon. This safety device is automatically released before the next mechanism reaches the gumming position.

The glue containers and operating parts therefor are so mounted that they may be merely lifted out without the necessity of releasing bolts, screws or other fastening means, and the mechanism thoroughly cleaned and oiled at the end of the day's operations. Fresh glue can then be put therein immediately before the start of the succeeding day's operation. The gumming die is simple in construction and readily accessible so that it likewise may be easily cleaned and oiled. An adjustable scraper has been provided to regulate the amount of glue upon the portion of the face of the glue rolls engaged by the gumming die.

The kicker for ejecting the finished bucket is both spring and positively operated so that there is no danger of the machine being rendered inoperative by the breaking of the spring.

The entire machine is simple and strong in construction and easily operated. By the arrangement provided the same can easily be operated by two girls whereas four would be required for a like number of independently operated mechanism. This secures a very material saving in the cost of production without sacrifice of productivity.

I am aware that changes in the form, and arrangement of parts of the invention may be made without departing from the spirit or sacrificing the advantages thereof, and I therefore reserve the right to make all such changes as fairly fall within the scope of the appended claims.

I claim:

1. In a machine of the class described, the combination of a support, a continuously rotating turret, a plurality of blank forming devices carried by said turret and operated by elements movable outwardly from the axis of said turret, and means on said support for moving said elements.

2. In a machine of the class described, the combination of a support, a continuously rotating turret, a plurality of blank forming devices carried by said turret and operated by means moving radially to said turret, and means on said support for moving said radially movable means.

3. In a machine of the class described, the combination of a support, a continuously rotating turret, a plurality of gluing and blank folding mechanisms carried by said turret, and means on said support for operating said gluing and blank folding mechanisms successively.

4. In a machine of the class described, the combination of a support, a continuously rotating turret, a plurality of gluing and blank folding mechanisms carried by said turret, each being operated by means moving radially to said turret, and means on said support to operate said radially moving means successively.

5. In a machine of the class described, the combination of a support, a continuously rotating turret, a plurality of box forming units arranged radially to said turret and including elements moving radially to said turret, means on said support for moving said elements, and means for ejecting the formed boxes radially from said units.

6. In a machine of the class described, the combination of a support, a continuously rotating turret, a plurality of box forming units arranged radially to said turret and including elements moving radially to said turret, means on said support for moving said elements, and means carried by said support for automatically ejecting formed boxes from said units.

7. In a machine of the class described, the combination of a support, a continuously rotating turret, a plurality of box forming units carried by said turret each including a form block, folding mechanism and gluing means, and means carried by said support for operating each gluing means and folding mechanism successively.

8. In a machine of the class described, the combination of a stationary support, a continuously rotating turret, a plurality of box forming units carried by said turret, each including a gluing device and safety means for controlling said gluing device.

9. In a machine of the class described, the combination of a stationary support, a continuously rotating turret, a plurality of box forming units carried by said turret, each including a blank support and a gluing device, and means to limit the operation of said gluing device when no blank is on said support.

10. In a machine of the class described, the combination of a stationary support, a continuously rotating turret, a plurality of radially arranged form blocks on said turret, means for folding blanks on said blocks, and means carried by said support for operating said folding means.

11. In a machine of the class described, the combination of a stationary support, a continuously rotating turret, a plurality of radially arranged form blocks on said turret, means for folding blanks on said blocks, means carried by said support for operating said folding means, and means for automatically removing formed boxes from said blocks.

12. In a machine of the class described, the combination of a form block, a blank support adjacent thereto, means for moving said support towards said block to bring the blank thereon into contact with said block, and blank folding members movable relative to said block while said blank is in contact therewith to fold flaps of the blank against the side walls of said block.

13. In a machine of the class described, the combination of a form block, a blank support adjacent thereto, means for moving said support towards said block to bring the blank thereon into contact with said block, blank folding members movable relative to said block while said blank is in contact therewith to fold flaps of the blank against the side walls of said block, and blank folding members movable through said support and parallel with and in close proximity to the side faces of said block to fold flaps of said blank upon said faces.

14. In a machine of the class described, a stationary support, a revoluble turret mounted thereon, a form block on said turret, and a glue pot resting upon and slidably engaging said form block.

15. In a machine of the class described, the combination of a form block, a blank support adjacent to said block, means for moving said blank support to bring the blank against said block, and folding means co-acting therewith comprising a presser plate and presser wings hingedly mounted on opposite edges of said plate.

16. In a machine of the class described, the combination of a form block, a blank support adjacent to said block, means for moving said blank support to bring a blank against said block, folding means co-acting therewith comprising a support movable toward and from said block, a presser plate trunnioned in said support, and presser wings hingedly mounted on opposite side edges of said plate.

17. In a machine of the class described, the combination of a form block, a blank support adjacent to said block, means for moving said blank support to bring a blank against said block, folding members operable through said blank support, folding means co-acting therewith comprising a support, a presser plate movable on said support into and out of operative engagement with said block, and presser members mounted on said presser plate and movable relative thereto into and out of operative engagement with said block.

18. In a machine of the class described, the combination of a form block, a blank support adjacent to said block, means for moving said blank support to bring a blank against said block, folding members operable through said block support, and folding means comprising a support, a presser plate movable on said support into and out of operative engagement with said block, presser wings hinged along one edge thereof on the side edges of said plate, said wings being moved relative to said plate by the relative movement of said plate and said support.

19. In a machine of the class described, the combination of a form block, a blank support adjacent to said block, means for moving said blank support to bring a blank against said block, and folding means coacting therewith comprising a support, a presser plate movable on said support into and out of operative engagement with said blank, presser wings hinged along one edge thereof on side edges of said plate, said wings being moved relative to said plate by relative movement of said plate and said support after said presser plate is in operative engagement with said block.

20. In a machine of the class described, a blank support, a form block above said support, means for moving said support toward said block to bring the blank thereon into contact therewith, and blank folding members movable relative to said block while said blank is in contact therewith to fold the flaps of the blank against the side walls of said block.

21. In a machine of the class described, a blank support, a form block above said support, means for raising said support toward said block to bring the blank thereon into contact therewith, and blank folding members movable through said support and parallel with and in close proximity to the said faces of said block to fold the flaps of said blank upon said faces.

22. In a machine of the class described, a blank support, a form block opposite said support, means for moving said support, toward said block to bring the body of the blank thereon into contact with the under face of said block, and yielding folding members beneath the blank on said support and movable opposite to and parallel with the side faces of said block to fold the flaps of said blank thereon.

23. In a machine of the class described, a blank support, and means for gripping a blank thereon while a tape bail is being inserted therein and for releasing said blank after said bail is in place.

24. In a machine of the class described, a stationary support, a revoluble turret mounted thereon, an ejector on said turret for discharging the finished bucket therefrom, and actuating means for said ejector carried by said support and controlled by the movement of said turret.

25. In a machine of the class described, a stationary support, a hollow slotted post fixedly mounted on said support, a slotted sleeve fitting about said post and revoluble thereon, means for actuating said sleeve, bucket ejecting means mounted on said sleeve, actuating means for said ejecting means mounted in said post and operating when a slot in said sleeve is in registration with the corresponding slot in said post.

26. In a machine of the class described, a stationary support, a hollow slotted post fixedly mounted in said support, a slotted sleeve fitting about and revolubly mounted on said post, bucket ejecting means mounted on said sleeve, and a spring pressed kicker mounted in said post and operably through said slots in said post and said sleeve when said slots are in registration to actuate said ejecting means.

27. In a machine of the class described, a stationary support, a hollow post fixedly mounted in said support, a sleeve fitting about and revolubly mounted on said post, and bucket ejecting means mounted on said sleeve and positively actuated in certain relative positions of said post and said sleeve.

28. In a machine of the class described, a stationary support, a hollow slotted post fixedly mounted on said support, a slotted sleeve fitting about and revolubly mounted upon said post, bucket ejecting means mounted on said sleeve, a kicker pivotally mounted in said post and operable through corresponding slots in said post and said sleeve to actuate said ejecting means when said slots are in registration, and arms mounted on said kicker and coacting with slots in said sleeve to positively actuate said kicker.

29. In a machine of the class described, a stationary support, a turret revoluble on said support, blank supporting means on said turret, a blank supply holder on said turret and guiding means on said holder to engage a blank when such blank is lifted within said holder and to position said blank upon said supporting means by relative movement of said blank and said guiding means.

30. In a machine of the class described, a stationary support, a turret revoluble on said support, blank supporting means on said turret, a blank supply holder on said turret below said blank supporting means, and guiding means on said holder to engage a blank when such blank is lifted within said holder and move said blank upward and into position on said supporting means by relative movement of said blank and said guiding means.

31. In a machine of the class described, a stationary support, a turret revoluble on said support, a plurality of separate operable units mounted on said turret and disposed about the axis thereof, and a blank supply holder mounted on said turret between each pair of said units.

32. In a machine of the class described, a stationary support, a turret revoluble on said support, a plurality of separate operable units mounted on said turret and disposed about the axis thereof, a blank supply holder for each of said units mounted on said turret, and blank guiding means interposed between each of said holders and its corresponding unit.

33. In a machine of the class described, the combination of a support, a continuously rotating turret on said support, a plurality of operating units carried by said turret, each comprising blank gumming means, blank folding means and box ejecting means, and means carried by said support in the path of each of said means for operating said means successively.

34. In a machine of the class described, the combination of a stationary support, a continuously rotating turret on said support, a plurality of operating units carried by said turret, each comprising blank gumming means, blank folding means and box ejecting means, each of said means being operated by elements having movement radially to said turret, and means carried by said support for moving said elements successively.

WILLIAM FUHR.